United States Patent
Blais et al.

(10) Patent No.: US 12,112,158 B1
(45) Date of Patent: *Oct. 8, 2024

(54) SYSTEM AND METHODS FOR UPDATING VEHICLE MODULES

(71) Applicant: Integrated Engineering, LLC, Salt Lake City, UT (US)

(72) Inventors: Peter Anthony Blais, Park City, UT (US); Damon Earl, Bountiful, UT (US); Chelsea Montana Throne, Riverton, UT (US)

(73) Assignee: Integrated Engineering, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,118

(22) Filed: Mar. 27, 2024

Related U.S. Application Data

(60) Provisional application No. 63/594,016, filed on Oct. 29, 2023.

(51) Int. Cl.
*G06F 8/65* (2018.01)
(52) U.S. Cl.
CPC ..................... *G06F 8/65* (2013.01)
(58) Field of Classification Search
CPC ..... G06F 11/1433; G06F 11/0766; G06F 8/65
See application file for complete search history.

(56) References Cited

U.S. PATENT DOCUMENTS

| | | | | |
|---|---|---|---|---|
| 2009/0119657 A1* | 5/2009 | Link, II | ................ | G06F 8/64 717/171 |
| 2011/0320089 A1* | 12/2011 | Lewis | ................ | G01C 21/3896 380/278 |
| 2015/0088370 A1* | 3/2015 | Vangelov | ............. | G07C 5/0858 701/33.2 |
| 2015/0277942 A1* | 10/2015 | Rork | ................... | G06F 9/44505 701/31.4 |
| 2023/0084842 A1* | 3/2023 | Ng | ........................... | G06F 8/65 701/32.7 |

* cited by examiner

*Primary Examiner* — Phillip H Nguyen
(74) *Attorney, Agent, or Firm* — Scale LLP

(57) ABSTRACT

Disclosed are methods, systems, and non-transitory computer readable memory for staging data and updating vehicle modules using staged data. For instance, a system may include: a user interface device configured to: receive and store a re-program file; and display a graphical user interface configured to receive a user input to initiate a re-program process for at least one onboard module of a vehicle. The system may also include a programming device configured to be physically and communicably coupled to an onboard port of the vehicle. The programming device may be configured to: receive, via a defined sequence of messages with the user interface device, and store, via defined operations with a local cache, mapping-and-byte data; re-program the at least one onboard module using the mapping-and-byte data; and in response to determining a checksum condition is satisfied, transmit a re-program success message to the user interface device.

18 Claims, 15 Drawing Sheets

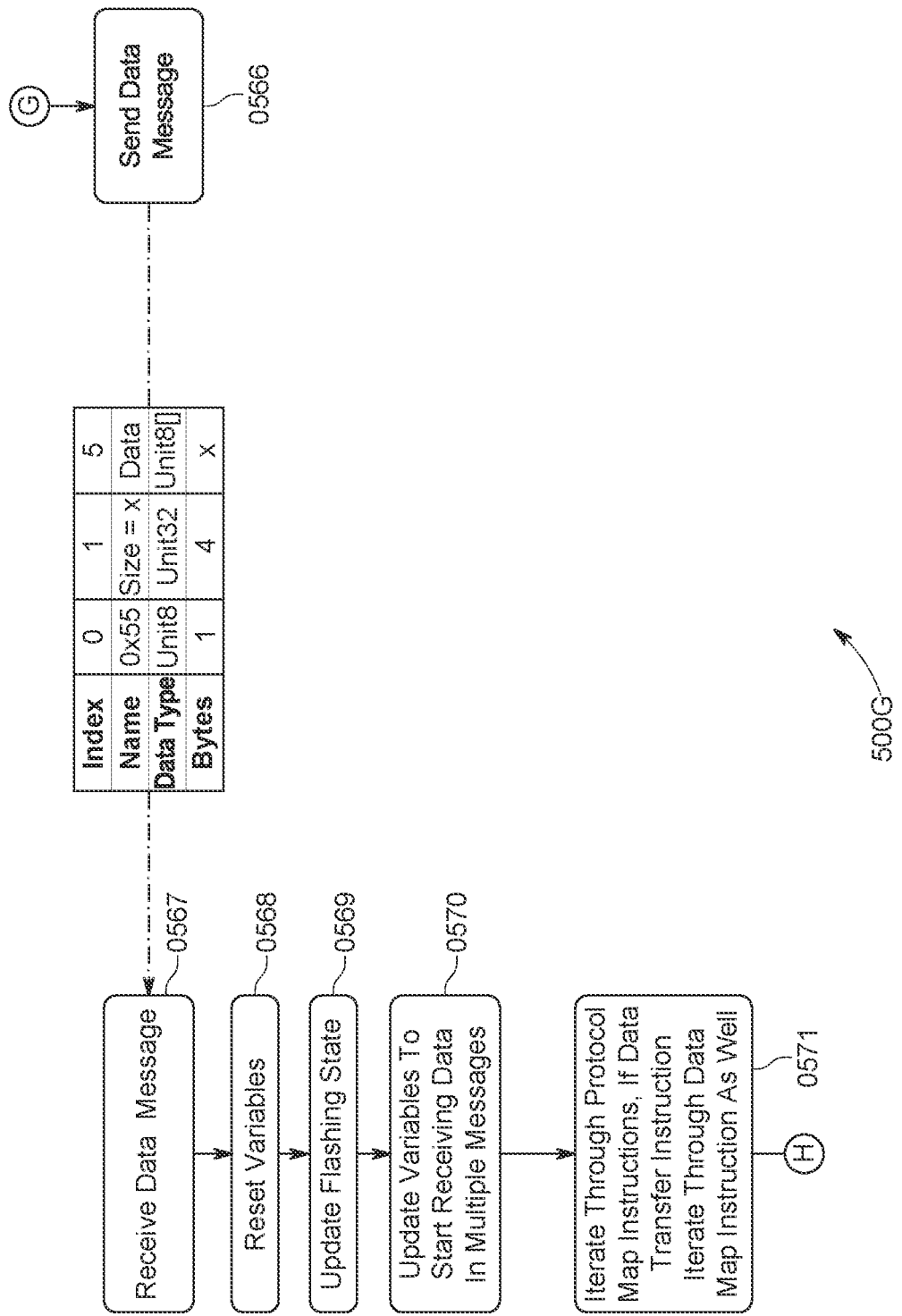

SYSTEM AND METHODS FOR UPDATING VEHICLE MODULES

CROSS-REFERENCE TO RELATED APPLICATION(S)

This application claims the benefit of priority under 35 U.S.C. §§ 120 and 119 (e) of U.S. Provisional Application No. 63/594,016, filed Oct. 29, 2023, entitled "System and Methods for Updating Vehicle Modules."

The contents of each of the above referenced applications are hereby incorporated by reference in its entirety.

TECHNICAL FIELD

Various aspects of the present disclosure relate generally to systems and methods for updating vehicle modules and, more particularly, to systems and methods for updating vehicle modules using an aftermarket programming device.

BACKGROUND

Generally, updating modules of vehicles required physically connecting to an onboard diagnostic device port and writing byte-level correct data to specific modules. In some cases, this process may damage modules or vehicle systems if the byte-level data is not precisely correct or as expected, as set by original equipment manufacturers (OEMs). In some cases, if the byte-level data is not precisely correct or timely, the OEM module may shut down, restart, or decline to proceed with the update process. Thus, there is a need for systems and methods that can update vehicle modules with high fidelity and within operational parameters of OEM modules.

The present disclosure is directed to overcoming one or more of these above-referenced challenges.

SUMMARY OF THE DISCLOSURE

According to certain aspects of the disclosure, systems, methods, and computer readable memory are disclosed for updating vehicle modules.

In some cases, a system for staging data and updating vehicle modules using staged data may include: a user interface device and a programming device. The user interface device may be configured to: receive and store a re-program file from a server; and display a graphical user interface configured to receive a user input to initiate a re-program process for at least one onboard module of a vehicle. The programming device may be configured to be physically and communicably coupled to an onboard port of the vehicle, wherein the onboard port is configured to be communicably coupled with the at least one onboard module, and the programming device is configured to be communicably coupled, via a wired or wireless communication, to the user interface device. The programming device may be configured to: receive, via a defined sequence of messages with the user interface device, and store, via defined operations with a local cache, one or combinations of: data checksum map metadata, protocol map metadata, data checksum map information, protocol map information, and a data map (collectively, mapping-and-byte data); in response to receiving an instruction message from the user interface device, re-program the at least one onboard module using the mapping-and-byte data; and in response to determining a checksum condition is satisfied, transmit a re-program success message to the user interface device.

In some cases, a computer-implemented method for staging data and updating vehicle modules using staged data may include: receiving, via a defined sequence of messages with a user interface device, and store, via defined operations with a local cache, one or combinations of: data checksum map metadata, protocol map metadata, data checksum map information, protocol map information, and a data map (collectively, mapping-and-byte data); in response to receiving an instruction message from the user interface device, re-programing at least one onboard module using the mapping-and-byte data; and in response to determining a checksum condition is satisfied, transmitting a re-program success message to the user interface device.

In some cases, a non-transitory computer readable memory may be configured to store instructions that, when executed by at least one processor, cause the at least one processor to perform a method for staging data and updating vehicle modules using staged data. The method may include: receiving, via a defined sequence of messages with a user interface device, and store, via defined operations with a local cache, one or combinations of: data checksum map metadata, protocol map metadata, data checksum map information, protocol map information, and a data map (collectively, mapping-and-byte data); in response to receiving an instruction message from the user interface device, re-programing at least one onboard module using the mapping-and-byte data; and in response to determining a checksum condition is satisfied, transmitting a re-program success message to the user interface device.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIGS. 5A-5I depicts dataflow diagrams for operations to stage and verify data for updating vehicle modules.

DETAILED DESCRIPTION

Figure 1:
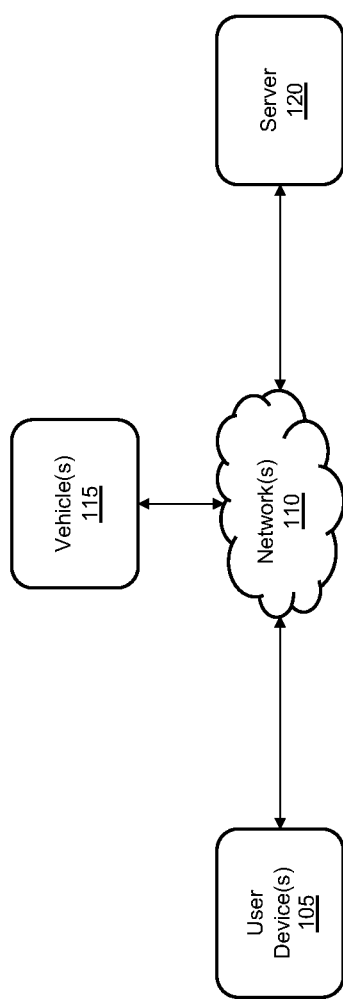
FIG. 1 depicts an example environment for updating vehicle modules.

Various aspects of the present disclosure relate generally to updating vehicle modules. In some cases, the systems of the present disclosure may include a user interface device and a programming device.

In some cases, the user interface device may be configured to: receive and store a re-program file; and display a graphical user interface configured to receive a user input to initiate a re-program process for at least one onboard module of a vehicle. For instance, the user interface device may receive the re-program file from a server that hosts re-program files, so that users may receive curated and verified re-program files that can be used to update a vehicle's modules without damaging the modules and/or properly navigate re-programing operations of OEM modules. The programming device may be configured to be physically and communicably coupled to an onboard port of the vehicle. For instance, the programming device may be a smart dongle that interfaces with an OBD 2 port and includes a processor and a local memory storage. The processor may execute operations to write specific byte strings (of re-program files) to specific memory addresses of modules of the vehicle. The onboard port may be configured to be communicably coupled with the at least one onboard module, to thereby pass the specific byte strings and related data to the module.

In some cases, the programming device may be configured to be communicably coupled, via a wired or wireless communication, to the user interface device. For instance, the programming device may be coupled by ethernet or USB (if physically wired) or coupled by WIFI or Bluetooth such as Bluetooth low energy (if wirelessly connected).

The programming device may be configured to: receive, via a defined sequence of messages with the user interface device, and store, via defined operations with a local cache, one or combinations of: data checksum map metadata, protocol map metadata, data checksum map information, protocol map information, and a data map (collectively, "mapping-and-byte data"). The defined sequence of messages may provide specific portions of a re-program file, so that the defined operations may store relevant data. The defined operations may ensure data integrity of specific byte-strings, so that when the programming device communicates specific write instructions to a module, the specific byte-strings are provided in a manner that reduces damage to vehicle modules/systems. For instance, the defined operations may perform additional checksums with each byte-string, in addition to Bluetooth or WIFI level message checksums. In this manner, staging update data for a module may avoid bit-flipping while receiving, caching, and loading data into a processor.

Next, the programming device may re-program the at least one onboard module using the mapping-and-byte data. In some cases, the programming device may re-program the module in response to receiving an instruction message from the user interface device or in response to a determination that the processor is staged with the mapping-and-byte data. The programming device may perform a staging process to ensure the byte data and operations are ready (e.g., loaded in processor memory and checksum verified) for the re-program process.

In response to determining a checksum condition is satisfied, the programming device may transmit a re-program success message to the user interface device. For instance, the programming device may determine an operation queue is empty and that checksums from the module match expected checksums loaded in processor memory.

Traditionally, the transfer of data to OBD modules for the purpose of reprogramming the modules often depends on the process of feeding a module many small strings of information. Each string is generally preceded by a request transmission from the module, and followed by an acknowledgement, although the acknowledgement may not always be provided. In most cases, there may also be "keep alive" messages and the like. When each entire "block" of data, consisting of a large quantity of shorter strings of data bytes, is transferred, the module and a reprogramming tool exchange a "checksum" of the data to ensure the correctness of the transfer. Usually, a programming module communicates these small strings of data via the OBD Port and handles all of the related requests, acknowledgments, and other keep alive communications directly. Due to communications problems, wired or wireless, it is possible for bits or bytes to be scrambled, and the data is not accepted by the module being programmed. This results in a failure of programming, which can damage the module. Thus, traditional re-programming can be frustrating for users and/or cause damage to modules and the like.

In contrast, the present disclosure describes methods and systems to relocate reprogramming-related processing directly to the OBD data port physical interface, using a smart dongle/programming device. The data is transferred in it's entirety (in one or more messages) via any method to the smart dongle/programming device. Only when the data has been completely transferred and checksum verified, the smart dongle/programming device may directly program the module from the OBD connector. Thus, the smart dongle/programming device may eliminate or reduce failures in programming from data transmission errors.

Thus, methods and systems of the present disclosure may be improvements to computer technology and/or vehicle performance or safety, as disclosed herein.

Environment

FIG. 1 depicts an example environment 100 for updating vehicle modules. The environment 100 may include one or more networks 110, one or more user devices 105, one or more vehicles 115, and a server 120, each of which may be described herein. Generally, the environment 100 depicts devices/interactions for updating vehicle modules.

The user device(s) 105 may (hereinafter "user device 105" for ease of reference) may be a personal computing device, such as a cell phone, a tablet, a laptop, or a desktop computer. In some cases, the user device 105 may be an extended reality (XR) device, such as a virtual reality device, an argument reality device, a mixed reality device, and the like. In some cases, the user device 105 may be associated with a user (e.g., a driver or passenger of a vehicle). The user may have a user account associated with the user device 105 that uniquely identifies the user (e.g., within the server 120). Additional features of the user device 105 and interactions with other devices are described below.

The network(s) 110 may include one or more local networks, private networks, enterprise networks, public networks (such as the internet), cellular networks, and satellite networks, to connect the various devices in the environment 100. Generally, the various devices of the environment 100 may communicate over network(s) 110 using, e.g., network communication standards that connect endpoints corresponding to the various devices of the environment 100.

The vehicle(s) 115 ("vehicle 115" for ease of reference) may be car, truck, or off-road vehicle. In some cases, the vehicle 115 may be an electric vehicle, a fuel powered vehicle (e.g., gas or diesel), or an alternative energy source vehicle (e.g., hydrogen or otherwise). In some cases, the vehicle 115 may be an autonomous vehicles, for example, whether that be fully autonomous or semi-autonomous. In some cases, the vehicle 115 may be a snowmobile, a tank, a bulldozer, a tractor, a van, a bus, a motorcycle, a scooter, a steamroller, and/or the like. The vehicle 115 may comprise a various components, such as a control system and drive system. Specific components of interest are discussed with respect to FIG. 3. In some cases, the vehicle 115 may have a variety of sensors including both internal sensors (e.g., to measure state features, such as position, velocity, speed, acceleration, etc.), feedback sensors (e.g., of actuators and adjustable components such as a powertrain system), and external sensors to perceive their surroundings.

The server 120 may be a computer, a server or set of servers, a cloud system, or a combination of the foregoing. The server 120 may coordinate data and/or instructions between various devices of the environment 100. In particular, the server 120 may manage user data (e.g., regarding accounts, vehicles, maps, powertrain data), manage re-program files, store user data/re-program files in datastores as shown and described with respect to FIG. 2. The datastores may store and manage relevant data for user device(s) 105, relevant data for vehicle(s) 115, and the like.

Server

Figure 2:
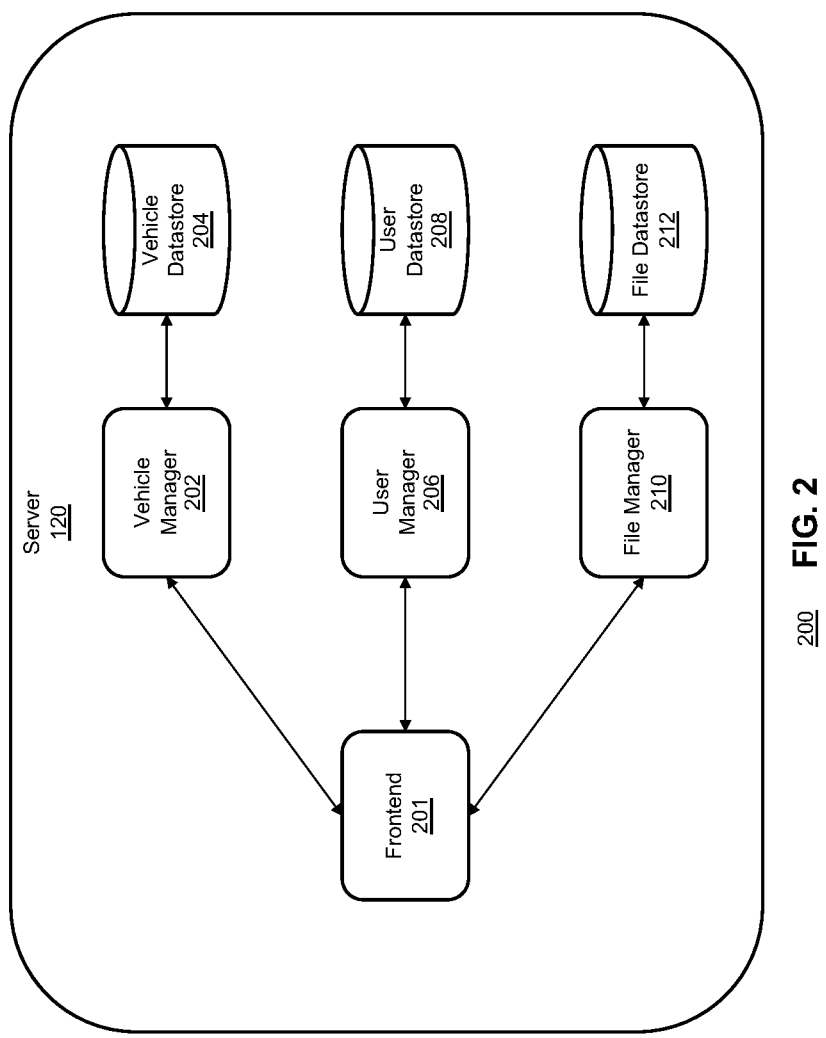
FIG. 2 depicts a block diagram of a server for updating vehicle modules.

FIG. 2 depicts a block diagram 200 of a server 120 for updating vehicle modules. Features of FIG. 2 may apply to any of FIGS. 1, 3, 4, 5A-5I, 6, and 7. The server 120 may include a frontend 201, a vehicle manager 202, a vehicle datastore 204, a user manager 206, a user datastore 208, a file manager 210, and/or a file datastore 212.

The frontend 201 may perform frontend processing and inbound/outbound routing of messages. The frontend 201 may be responsible for obtaining various data from users and/or vehicles, pre-process it such that the data is suitable for further processing by the other features of the server 120. In some embodiments, the frontend 201 may verify that the source of the data is a user device 105 and/or vehicle 115, e.g., registered with the server 120.

The vehicle manager 202 may manage and process data regarding vehicle(s) of user(s). The vehicle manager 202 may process and store the data in the vehicle datastore 204, such that vehicle(s) are associated with users and data regarding re-program files (e.g., installation count, success, failure, context data, and the like).

The vehicle datastore 204 may record and/or store the data regarding vehicle(s) of user(s). For instance, the vehicle datastore 204 may store the data in structured or unstructured databases, records, files, data lakes, and like.

The user manager 206 may manage and process data related to users. The user manager 206 may determine re-programming data is associated with a user by an identifier (for example, using a user identifier assigned by the server 120). For instance, the user manager 206 may determine a user device 105/vehicle 115 is associated with a user and tag inbound re-programming data with the identifier. In some cases, the re-programming data may already include the identifier. For example, the user manager 206 may query the user datastore 208 with the identifier and determine if any matches appear. If so, the user manager 206 may process responsive data (e.g., files, recommendations, instructions, and the like), and/or update/provide the responsive data (e.g., records associated with the identifier). Thus, in some cases, the server 120 may remain up-to-date regarding each user. Moreover, the server 120 may provide vehicle, module, or user-specific re-programming data, instructions, or recommendations on a vehicle, module, or user-specific basis.

The user datastore 208 may record and/or store the data related to users. For instance, the vehicle datastore 204 may store the data in structured or unstructured databases, records, files, data lakes, and like.

The file manager 210 may manage and process re-programming files. In some cases, the file manager 210 may generate, update, and send re-programming files to user devices and/or alerts regarding installed re-programming files.

The file datastore 212 may record and/or store the re-programming files. For instance, the file datastore 212 may store the data in structured or unstructured databases, records, files, data lakes, and like.

Vehicle

Figure 3:
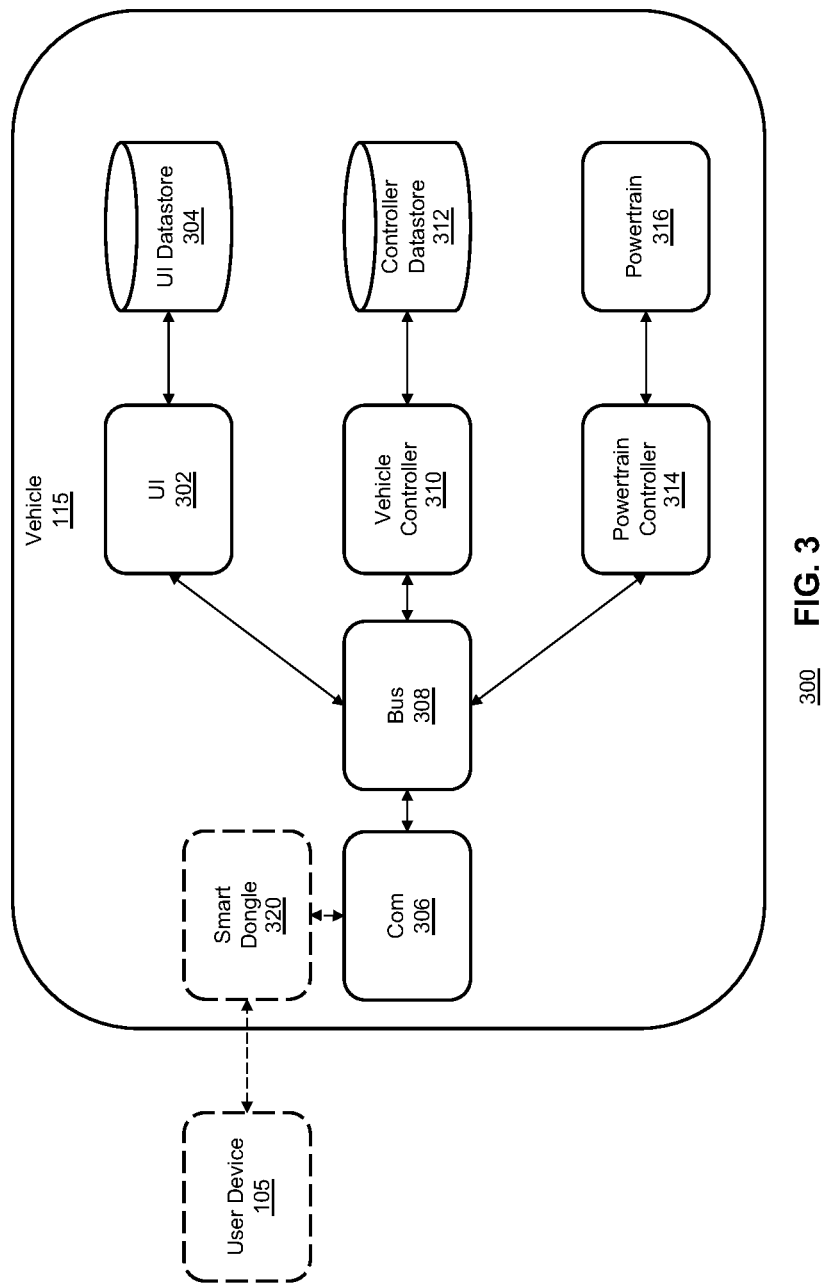
FIG. 3 depicts a block diagram of a vehicle interacting with a user device for updating vehicle modules.

FIG. 3 depicts a block diagram 300 of a vehicle 115 interacting with a user device for updating vehicle modules. Features of FIG. 3 may apply to any of FIGS. 1, 2, 4, 5A-5I, 6, and 7. The vehicle 115 may include a smart dongle 320 (optionally, detachable, or fixed), a communication module 306, a user interface (UI) 302, and/or the like. The vehicle 115 may also include a UI datastore 304, a bus 308, a vehicle controller 310 linked to a controller datastore 312, a powertrain controller 314, and/or a powertrain 316.

The smart dongle 320 (e.g., designed to interface with a port of an on board diagnostic device, e.g., OBD 2) may communicate with the user device 105 via wired (e.g., ethernet, USB, and the like) or wireless (e.g., WIFI, Bluetooth, and the like) communication standards. In some cases, the user device 105 may host and provide re-program files to smart dongle 320, as discussed herein.

The UI 302 may allow a user to interface with the components of the vehicle via direct interaction and/or the user device 105. The UI 302 may provide users the ability to select options as to how to adjust the vehicle settings, such as module settings. The UI datastore 304 may collect, store, and transmit information specific to any user interacting with the UI 302.

The communication module 306 may be a wireless communication system (e.g., radio, WIFI, cellular, or satellite communications). The communication module 306 may transmit data to the user device 105 and/or the server 120, and receive instructions and/or data from the user device 105 and/or the server.

Generally, the smart dongle 320 may pass data, instructions, or information from the user device 105/server 120 to the bus 308, e.g., to the vehicle controller 310 and/or powertrain controller 314 (or other modules of the vehicle). For instance, the bus 308 may format of the data, instruction, or information (using various techniques, including ethernet, OBD techniques, or serial com techniques, and the like) to match a format accepted by internal systems of the vehicle 115.

The bus 308 may relay the data, information, and instructions between various endpoints on the vehicle. In some cases, the bus 308 may implement both a bus controller and a bus interface designed based on one or more specifications of the vehicle 115 at hand.

The vehicle controller 310 may control different parts of the vehicle based on data input to the actuation controls of the vehicle, sensor data, and instructions from the controller datastore 312.

The powertrain controller 314 may manage the powertrain 316 and gather data regarding how the powertrain 316 is operating (generally, "powertrain performance"). The powertrain controller 314 may adjust the powertrain 316, e.g., based on data updated in accordance with re-programming files staged and verified by the smart dongle 320 from the user device 105. In response, the powertrain controller 314 may generate machine instructions that, when executed by powertrain hardware, update the powertrain settings accordingly. The powertrain 316 may include software and hardware components capable of executing machine instructions and adjust the powertrain settings of the vehicle. While the powertrain controller 314 and powertrain 316 are depicted as exemplary modules for re-programming, other such modules and system may be re-programmed using different re-program files.

The vehicle 115 may include one or more of the components described above. The vehicle 115 may include original equipment manufacturer (OEM) hardware designed for use by end-users, and/or after-market hardware/software to provide additional capabilities or software functions.

Routine

Figure 4:
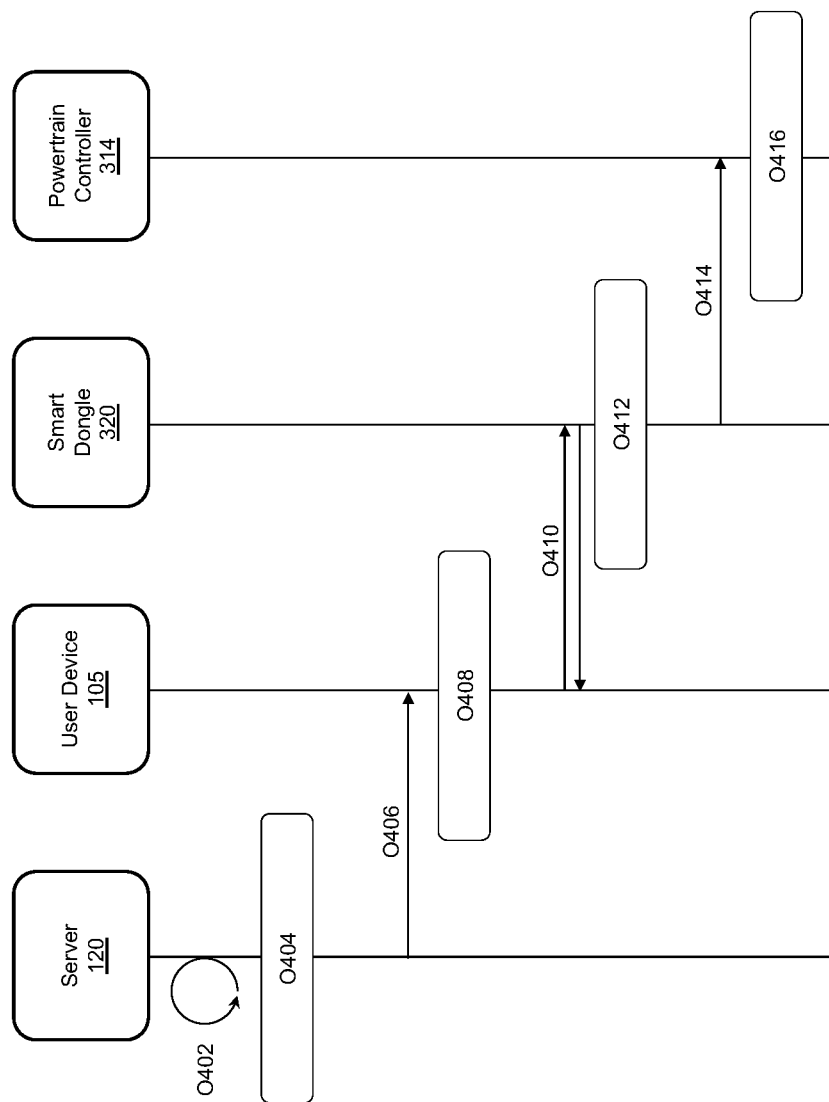
FIG. 4 depicts a flowchart of an exemplary routine for updating vehicle modules.

FIG. 4 depicts a flowchart of an exemplary routine 400 for updating vehicle modules. Features of FIG. 4 may apply to any of FIGS. 1, 2, 3, 5A-5I, 6, and 7.

In the routine 400, the method may be performed by one or more systems, such as the systems described with respect to FIGS. 1-3. The routine 400 may start at operation O402, where the server 120 may receive and store at least one re-program file. The re-program file may be generated and tested by engineers associated with the server 120, and uploaded to the server 120 for distribution to user devices, in response to user requests to re-programming files.

At operation O404, the server 120 may select a re-program file for transmission to a user device 105. For instance the server 120 may select a re-program file based on a user request for a specific type of action/performance, vehicle, and/or module. In some cases, re-program files may be updated, and the server 120 may determine to transmit the updated files to user devices, so that user devices 105 are ready to re-program modules of vehicles.

At operation O406, the server 120 may transmit the re-program file to user device 105. The user device 105 may receive the re-program file. In some cases, the server 120 may provide additional data or information, such as descriptions, instructions, or warnings regarding the re-program file.

At operation O408, the user device 105 may generate and display graphical user interfaces to a user. The graphical user interfaces may instruct the user on how to set up, e.g., the user device 105 and smart dongle 320 to complete a module re-program. For instance, the graphical user interfaces may instruct the user on how engage the smart dongle 320 with a port (e.g., an OBD 2 port) or connect the user device 105 and smart dongle 320 using Bluetooth low energy.

At operation O410, the user device 105 and the smart dongle 320 may perform a data transmission to receive, verify, and cache data for a module re-programming. See, e.g., FIGS. 5A-5G. For instance, the data transmission may be conducted in accordance with the defined sequence of messages to provide specific portions of the re-program file, so that the defined operations may store relevant data. The defined operations may ensure data integrity of specific byte-strings, so that when the smart dongle 320 communicates specific write instructions to a module, the specific byte-strings are provided in a manner that reduces damage to vehicle modules/systems. For instance, the defined operations may perform additional checksums with each byte-string, in addition to communication (e.g., Bluetooth or WIFI) level message checksums. In this manner, staging update data for a module may avoid bit-flipping while receiving and caching data.

At operation O412, the smart dongle 320 may load and verify data in a processor from the local cache. See, e.g., FIG. 5H. At operation O414, the smart dongle 320 may re-program a target module, such as the powertrain controller 314 (see, e.g., FIG. 6).

At operation O416, the powertrain controller 314 may write new data in accordance with messages from the smart dongle 320, requests responses, or provide feedback (e.g., checksums) and the like, to re-program the powertrain controller 314.

Staging and Verifying Data, and Loading and Verifying Data

FIGS. 5A-5I depicts dataflow diagrams 500A, 500B, 500C, 500D, 500E, 500F, 500G, 500H, and 500I for operations O501-O587 to stage and verify data for updating vehicle modules. Features of FIG. 5A-5I may apply to any of FIGS. 1, 2, 3, 4, 6, and 7. The operations of FIGS. 5A-5I may be performed by the smart dongle 320 and the user device 105. While the operations depicted in FIGS. 5A-5I are depicted in a defined order to provide, verify, stage, and load re-program data, the order may be re-arranged or combined based on different communication standards, storage constraints, and the like. The operations depicted in FIGS. 5A-5I may depict defined sequence of messages and defined operations in the flow diagrams 500A, 500B, 500C, 500D, 500E, 500F, 500G, 500H, and 500I.

Figure 5A:
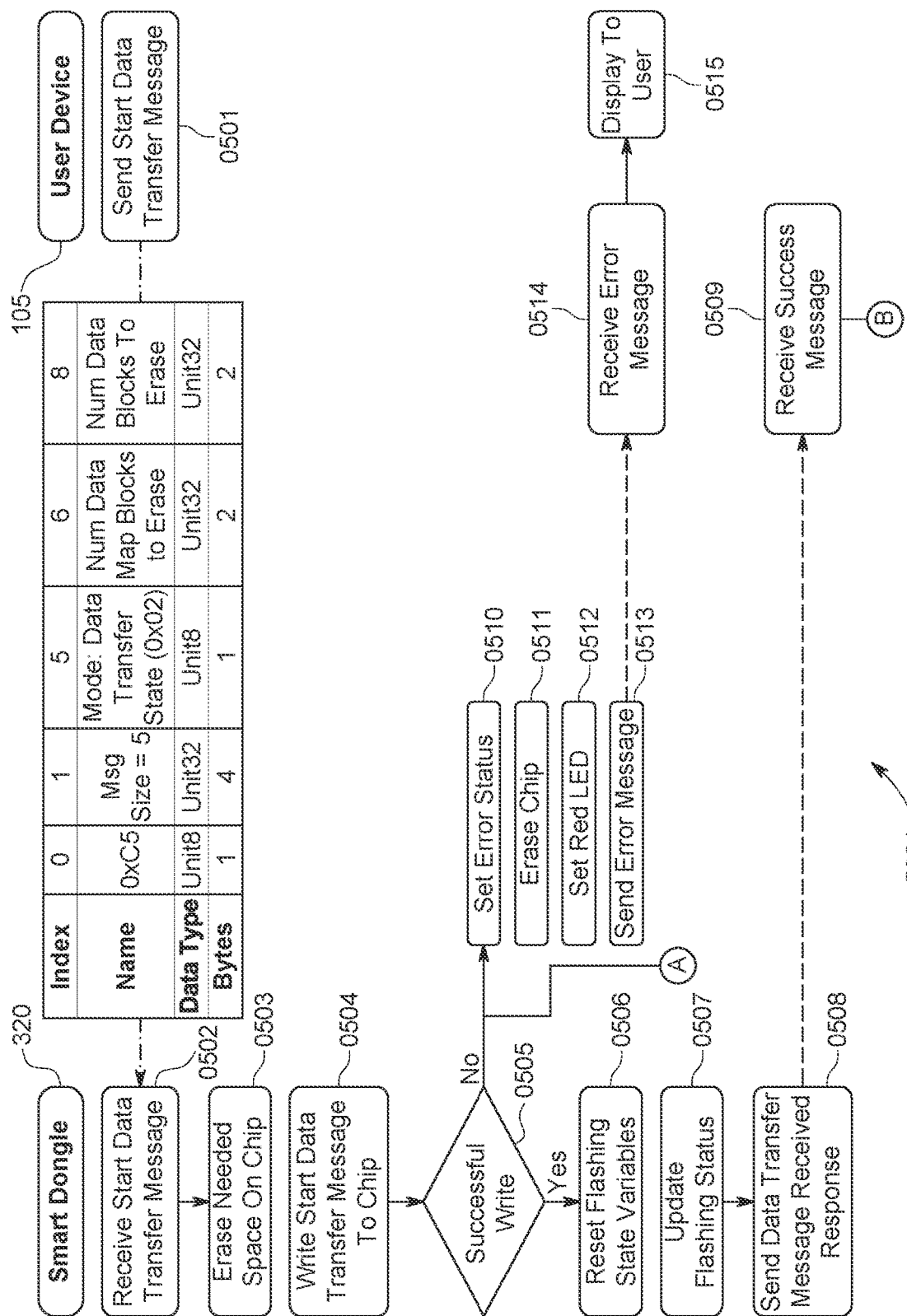

In FIG. 5A, the flow diagram 500A may depict the user device 105 transmitting, at operation O501, a start data transfer message and, at operation O502 through operation O515, operations of the smart dongle 320 in response to receiving, at operation O502, the start data transfer message. For instance, the smart dongle 320 may erase, at operation O503, space on a local cache, and write, at operation O504, the start data transfer message to the local cache. The smart dongle 320 may, at operation O505, determine whether the erasing/writing was successful. Based on a successful state of erasing/writing to the local cache (operation O505: Yes), the smart dongle 320 may transmit, at operation O508, a confirmation/success message and move to point B. The user device 105 may receive, at operation O509, the confirmation/success message. In some cases, the smart dongle 320 may reset, at operation O506, flashing state variables and/or update, at operation O507, flashing status.

Based on a failure state of erasing/writing to the local cache (operation O505: No), the smart dongle 320 may transmit, at operation O513, an error message and perform other actions (e.g., set status at operation O510, erase data at operation O511, change indicator settings at operation O512, and the like). If other conditions in FIGS. 5B-5I also trigger an error state, they may return to point A to send an error message and the like. At operation O514, the user device 105 may receive the error message and, at operation O515, display a graphical user interface informing the user of the error message and, if any actions to take.

An example start data transfer message may be depicted in Table 1, below.

TABLE 1

| index | 0 | 1 | 5 | 6 | 8 |
|---|---|---|---|---|---|
| name | 0 × C5 | msg size = 5 | mode: data transfer state (0 × 02) | num data map blocks to erase | num data blocks to erase |
| data type | unit8 | unit32 | unit8 | unit32 | unit32 |
| bytes | 1 | 4 | 1 | 2 | 2 |

Figure 5B:
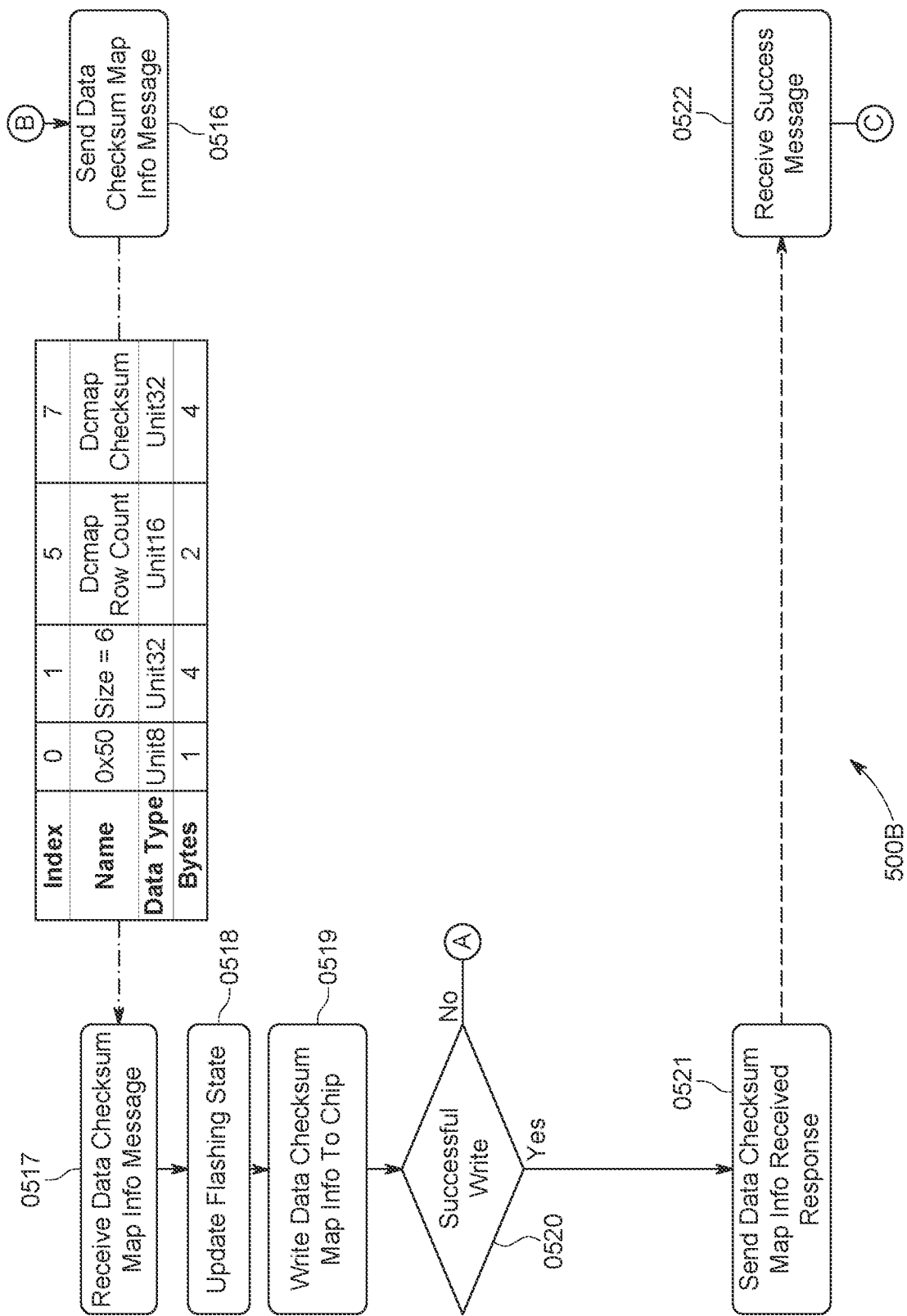

In FIG. 5B, the flow diagram 500B may depict (from point B) the user device 105 transmitting, at operation O516, a data checksum map metadata message and, at operation O516 through operation O522, operations of the smart dongle 320 in response, at operation O517, to receiving the data checksum map metadata message. For instance, the smart dongle 320 may update, at operation O518, flashing state and/or write, at operation O519, data checksum map metadata to the local cache. The smart dongle 320 may, at operation O520, determine whether the writing was successful. Based on a successful state of writing to the local cache (operation O520: Yes), the smart dongle 320 may transmit, at operation O521, a confirmation/success message and move to point C. The user device 105 may receive, at operation O522, the confirmation/success message. Based on a failure state of writing to the local cache (operation O520: No), the smart dongle 320 may go to point A and transmit an error message.

An example data checksum map metadata message may be depicted in Table 2, below.

TABLE 2

| index | 0 | 1 | 5 | 7 |
|---|---|---|---|---|
| name | 0 × 50 | size = 6 | domap row count | dcmap checksum |
| data type | unit8 | unit32 | unit16 | unit32 |
| bytes | 1 | 4 | 2 | 4 |

Figure 5C:
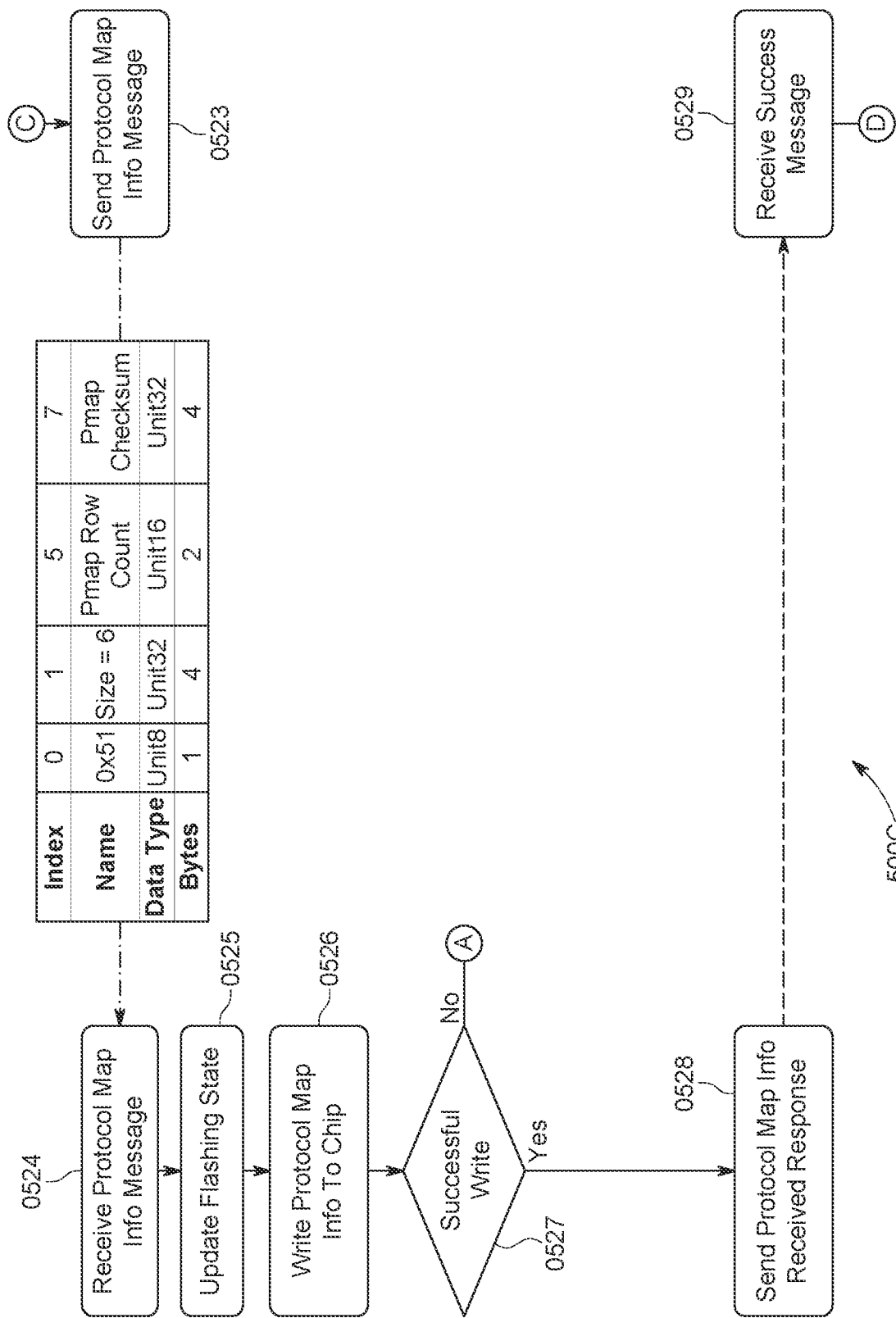

In FIG. 5C, the flow diagram 500C may depict (from point C) the user device 105 transmitting, at operation O523, a protocol map metadata message and, at operation O524 through operation O529, operations of the smart dongle 320 in response to receiving, at operation O524, the protocol map metadata message. For instance, the smart dongle 320 may update, at operation O525, flashing state and/or write, at operation O526, protocol map metadata to the local cache. The smart dongle 320 may, at operation O527, determine whether the writing was successful. Based on a successful state of writing to the local cache (operation O527: Yes), the smart dongle 320 may transmit, at operation O528, a confirmation/success message and move to point D. The user device 105 may receive, at operation O529, the confirmation/success message. Based on a failure state of writing to the local cache (operation O527: nes), the smart dongle 320 may go to point A and transmit an error message.

An example protocol map metadata message may be depicted in Table 3, below.

TABLE 3

| index | 0 | 1 | 5 | 7 |
|---|---|---|---|---|
| name | 0 × 51 | size = 6 | pmap row count | pmap checksum |
| data type | unit8 | unit32 | unit16 | unit32 |
| bytes | 1 | 4 | 2 | 4 |

Figure 5D:
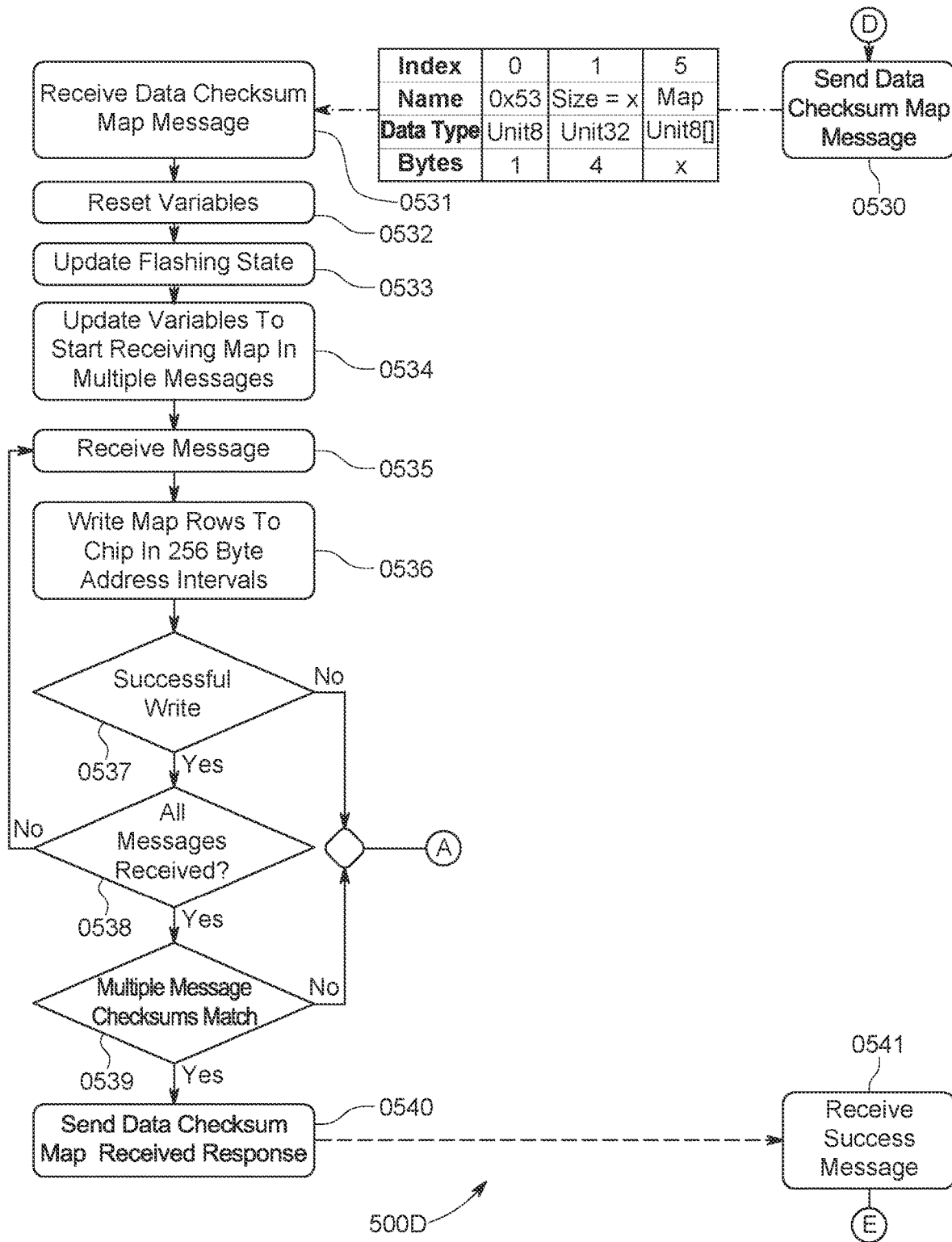

In FIG. 5D, the flow diagram 500D may depict (from point D) the user device 105 transmitting, at operation O530, a data checksum map message and, at operation O531 through operation O541, operations of the smart dongle 320 in response to receiving, at operation O531, the data checksum map message. For instance, the smart dongle 320 may reset, at operation O532, variables; update, at operation O533, flashing state; and/or write, at operation O534 through operation O539, data checksum map to the local cache. Based on a successful state of writing to the local cache and checksums verifying the written data (operation O537 and operation O539: Yes), the smart dongle 320 may transmit, at operation O540, a confirmation/success message and move to point E. The user device 105 may receive, at operation O541, the confirmation/success message. Based on a failure state of writing to the local cache or checksums not verifying the written data (operation O537 and operation O539: No), the smart dongle 320 may go to point A and transmit an error message.

In some cases (e.g., Bluetooth low energy), the data checksum map may be transmitted using more than one message. In this case, the smart dongle 320 may loop through writing checksum map data for each message and, after receiving all messages, determine the checksums verify the data. In particular, the smart dongle 320 may update, at operation O534, variables to start receiving map in multiple messages. The smart dongle 320 may receive, at operation O535, a message; write, at operation O536, map rows to local cache in 256 byte address intervals; determine, at operation O537, whether the write was successful; if operation O537 returns no, proceed to point A and transmit the error message; if operation O537 returns yes, determine, at operation O538, whether all messages have been received; if operation O538 returns no, return to receive, at operation O535, another message; if operation O538 returns yes, determine, at operation O539, whether multiple checksums match; if operation O539 returns no, proceed to point A and transmit the error message; if operation O539 returns yes, proceed to transmit a confirmation/success message.

An example data checksum map message may be depicted in Table 4, below.

TABLE 4

| index | 0 | 1 | 5 |
|---|---|---|---|
| name | 0 × 52 | size = x | map |
| data type | unit8 | unit32 | unit8[ ] |
| bytes | 1 | 4 | X |

Figure 5E:
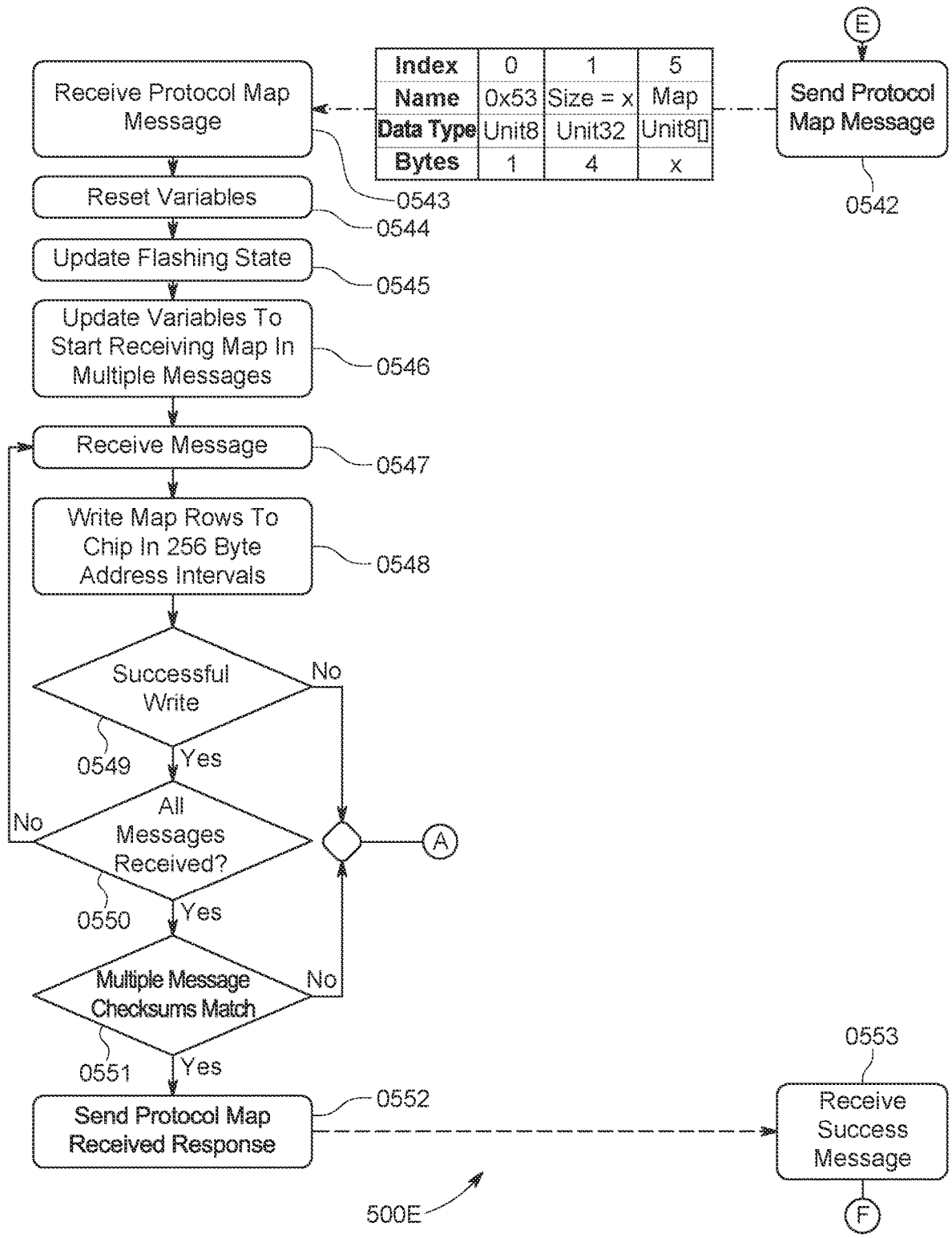

In FIG. 5E, the flow diagram 500E may depict (from point E) the user device 105 transmitting, at operation O542, a protocol map message and, at operation O543 through operation O553, operations of the smart dongle 320 in response to receiving, at operation O543, the protocol map message. For instance, the smart dongle 320 may reset, at operation O544, variables; update, at operation O545, flashing state; and/or write, at operation O546 through operation O551, protocol map to the local cache. Based on a successful state of writing to the local cache and checksums verifying the written data (operation O549 and operation O551: Yes), the smart dongle 320 may transmit, at operation O552, a confirmation/success message and move to point F. The user device 105 may receive, at operation O553, the confirmation/success message. Based on a failure state of writing to the local cache or checksums not verifying the written data (operation O549 and operation O551: No), the smart dongle 320 may go to point A and transmit an error message.

In some cases (e.g., Bluetooth low energy), the protocol map may be transmitted using more than one message. In this case, the smart dongle 320 may loop through writing map data for each message and, after receiving all messages, determine the checksums verify the data. In particular, the smart dongle 320 may update, at operation O546, variables to start receiving map in multiple messages. The smart dongle 320 may receive, at operation O547, a message; write, at operation O548, map rows to local cache in 256 byte address intervals; determine, at operation O549, whether the write was successful; if operation O549 returns no, proceed to point A and transmit the error message; if operation O549 returns yes, determine, at operation O550, whether all messages have been received; if operation O550 returns no, return to receive, at operation O547, another message; if operation O550 returns yes, determine, at operation O551, whether multiple checksums match; if operation O551 returns no, proceed to point A and transmit the error message; if operation O551 returns yes, proceed to transmit a confirmation/success message.

An example protocol map message may be depicted in Table 5, below.

TABLE 5

| index | 0 | 1 | 5 |
|---|---|---|---|
| name | 0 × 53 | size = x | map |
| data type | unit8 | unit32 | unit8[ ] |
| bytes | 1 | 4 | X |

Figure 5F:
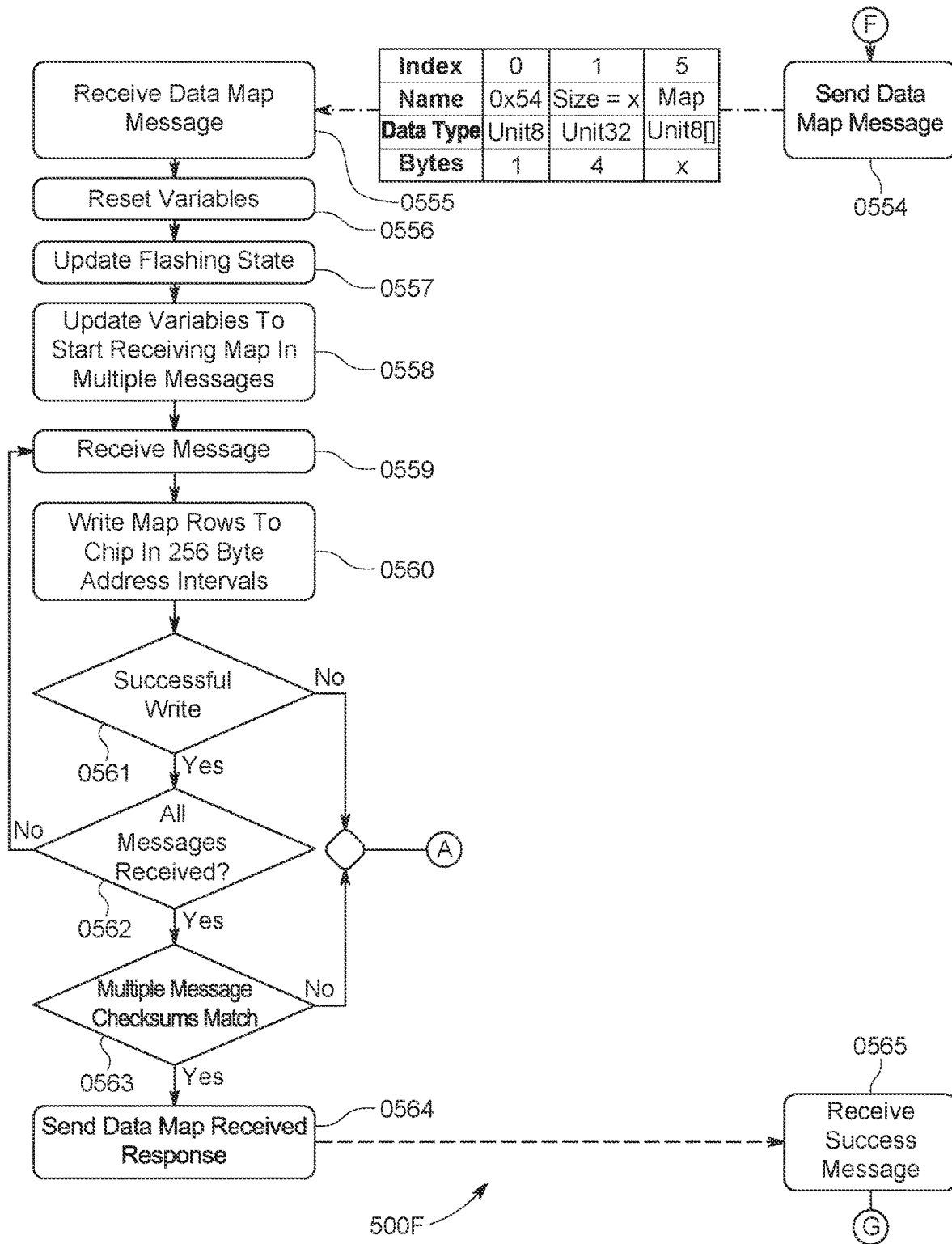

In FIG. 5F, the flow diagram 500F may depict (from point F) the user device 105 transmitting, at operation O554, a data map message and, at operation O555 through operation O565, operations of the smart dongle 320 in response to receiving, at operation O555, the data map message. For instance, the smart dongle 320 may reset, at operation O556, variables; update, at operation O557, flashing state; and/or write, at operation O558 through operation O563, data map to the local cache. Based on a successful state of writing to the local cache and checksums verifying the written data (operation O561 and operation O563: Yes), the smart dongle 320 may transmit, at operation O564, a confirmation/success message and move to point G. The user device 105 may receive, at operation O565, the confirmation/success message. Based on a failure state of writing to the local cache or checksums not verifying the written data (operation O561 and operation O563: No), the smart dongle 320 may go to point A and transmit an error message.

In some cases (e.g., Bluetooth low energy), the data map may be transmitted using more than one message. In this case, the smart dongle 320 may loop through writing data map for each message and, after receiving all messages, determine the checksums verify the data. In particular, the smart dongle 320 may update, at operation O558, variables to start receiving map in multiple messages. The smart dongle 320 may receive, at operation O559, a message; write, at operation O560, map rows to local cache in 256 byte address intervals; determine, at operation O561, whether the write was successful; if operation O561 returns no, proceed to point A and transmit the error message; if operation O561 returns yes, determine, at operation O562, whether all messages have been received; if operation O562 returns no, return to receive, at operation O559, another message; if operation O562 returns yes, determine, at operation O563, whether multiple checksums match; if operation O563 returns no, proceed to point A and transmit the error message; if operation O563 returns yes, proceed to transmit a confirmation/success message.

An example data map message may be depicted in Table 6, below.

TABLE 6

| index | 0 | 1 | 5 |
|---|---|---|---|
| name | 0 × 54 | size = x | map |
| data type | unit8 | unit32 | unit8[ ] |
| bytes | 1 | 4 | X |

At this point, the local cache of the smart dongle 320 has staged and verified data to re-program a target module. As described above, the data is verified using additional checksums, so as avoid bit-flipping when passing specific bytestrings. Next, in FIGS. 5G and 5H, the smart dongle 320 may load the data from the local cache into the processor and verify data before re-programming the target module.

In FIG. 5G, the flow diagram 500G may depict (from point G) the user device 105 transmitting, at operation O566, a data message and, at operation O567 through operation O581, operations of the smart dongle 320 in response to receiving the data message. For instance, the smart dongle 320 may reset, at operation O568, variables; update, at operation O569, flashing state; and/or write, at operation O570 through operation O579, data from the local cache to the processor. For instance, the smart dongle 320 may first update, at operation O570, variables to start receiving data in multiple messages. The smart dongle 320 may iterate, at operation O571, through protocol map instructions and, if data transfer instructions are present, iterate through data map instructions by proceeding to point H to receive messages from local cache to the processor.

Figure 5H:
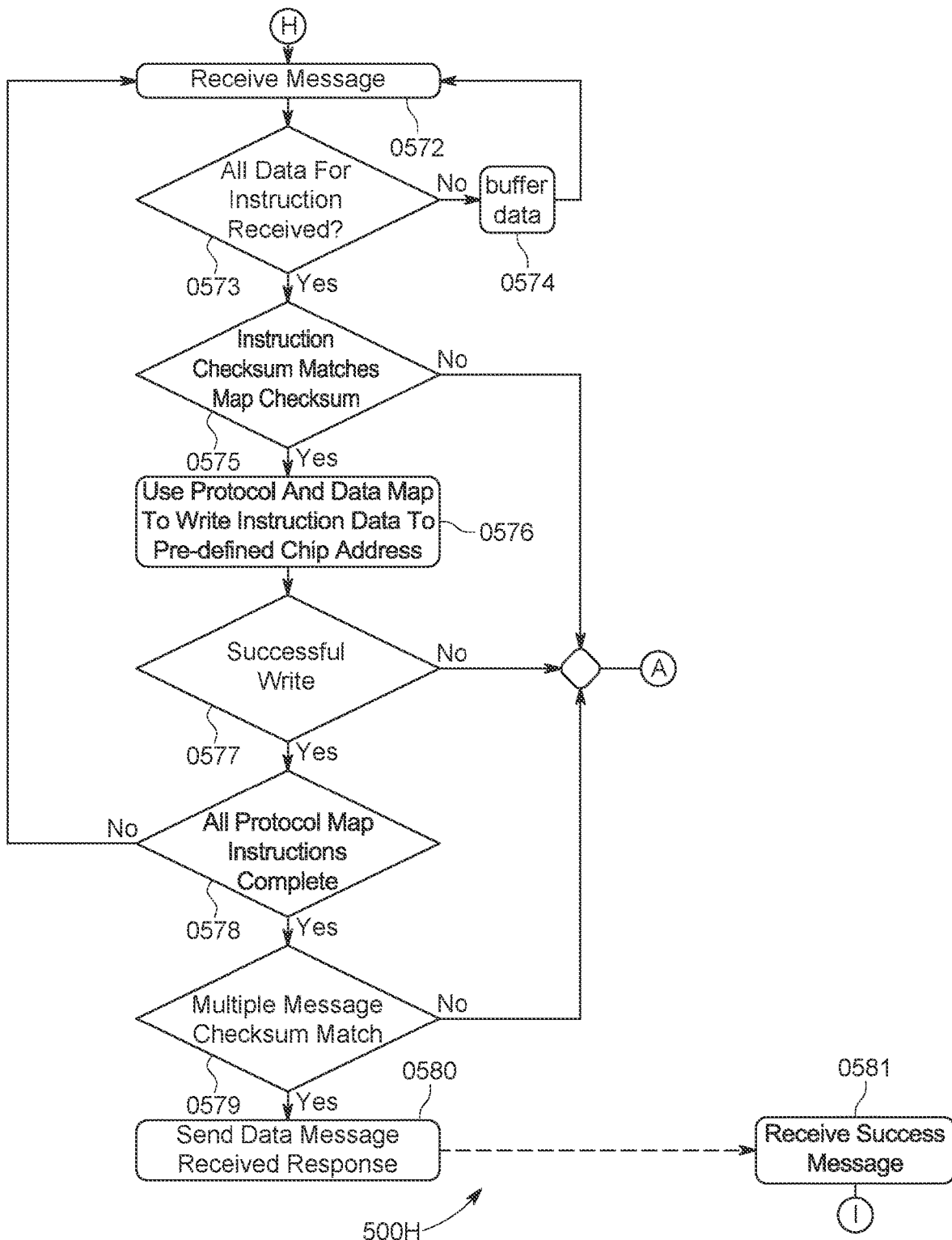

In FIG. 5H, the flow diagram 500H may depict (from point H) the processor receiving a message, at operation O572, and then load and verify data using the following:

(1) determine, at operation O573, whether all data for instruction received; if operation O573 returns no, buffer, at operation O574, until all data is received; if operation O573 returns yes, proceed.

(2) determine, at operation O575, whether instruction checksum matches map checksum; if operation O575 returns no, move to point A; if operation O575 returns yes, proceed.

(3) use, at operation O576, protocol and data map to write instruction to processor address.

(4) determine, at operation O577, if data was successfully written to processor address; if operation O577 returns no, move to point A; if operation O577 returns yes, proceed.

(5) determine, at operation O578, if all protocol map instructions are complete; if operation O578 returns no, loop to receive the next message from the local cache; if operation O578 returns yes, proceed.

(6) determine, at operation O579, if message checksums match; if operation O579 returns no, move to point A; if operation O579 returns yes that is the checksums match, proceed to transmit, at operation O580, a confirmation/success message and move to point I. The user device 105 may receive, at operation O581, the confirmation/success message.

An example data message may be depicted in Table 7, below.

TABLE 7

| index | 0 | 1 | 5 |
|---|---|---|---|
| name | 0 × 54 | size = x | data |
| data type | unit8 | unit32 | unit8[ ] |
| bytes | 1 | 4 | X |

Figure 5I:
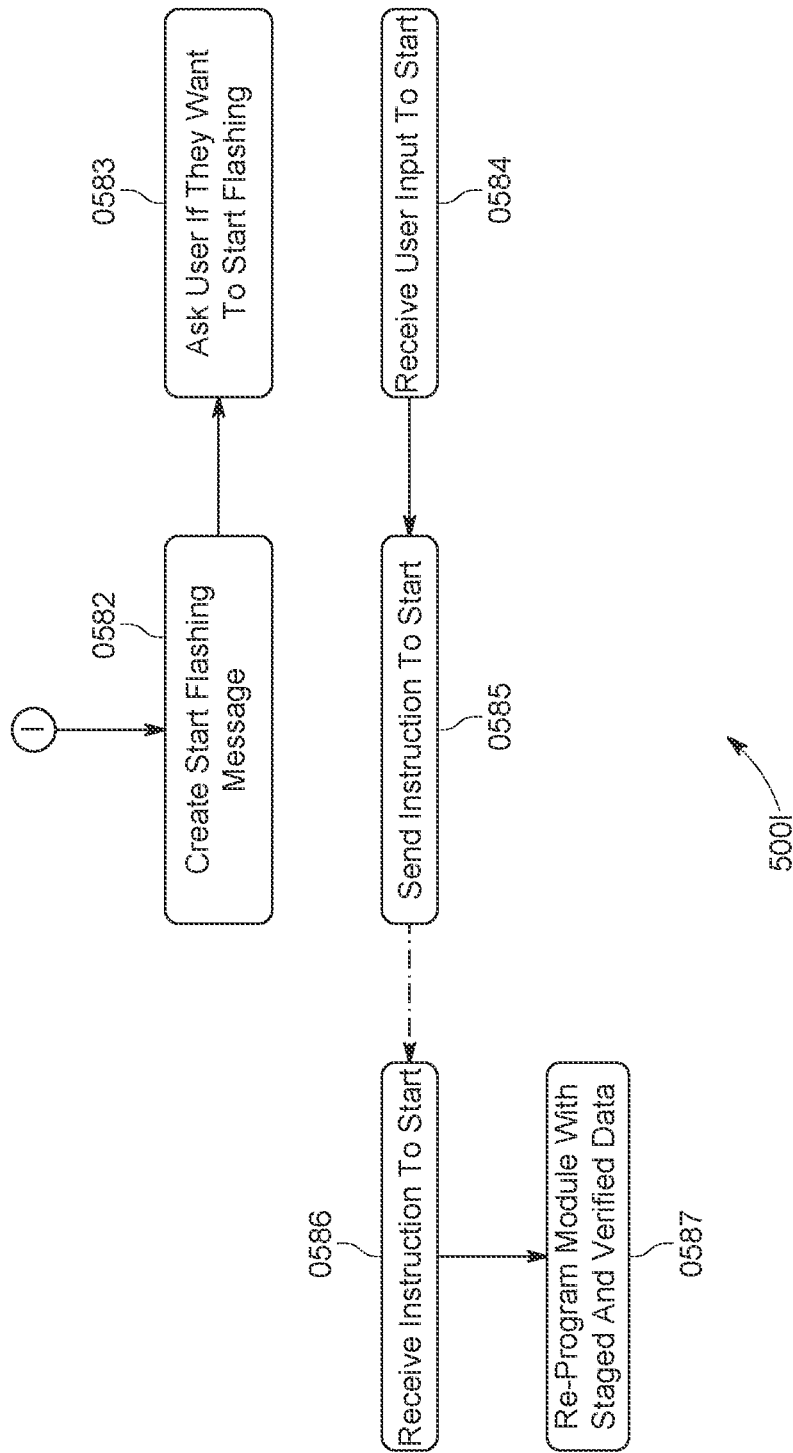

In FIG. 5I, the flow diagram 500I may depict (from point I) the user device 105 generating, at operation O582, a message and displaying, at operation O583, the message (e.g., to start flashing). In response to receiving, at operation O584, a user input to start, the user device 105 may transmit, at operation O585, an instruction to start. The smart dongle 320 may receive, at operation O586, the instruction to start and, then re-program, at operation O587, the target module with the staged/loaded and verified data. See, e.g., FIG. 6.

Updating Module

Figure 6:
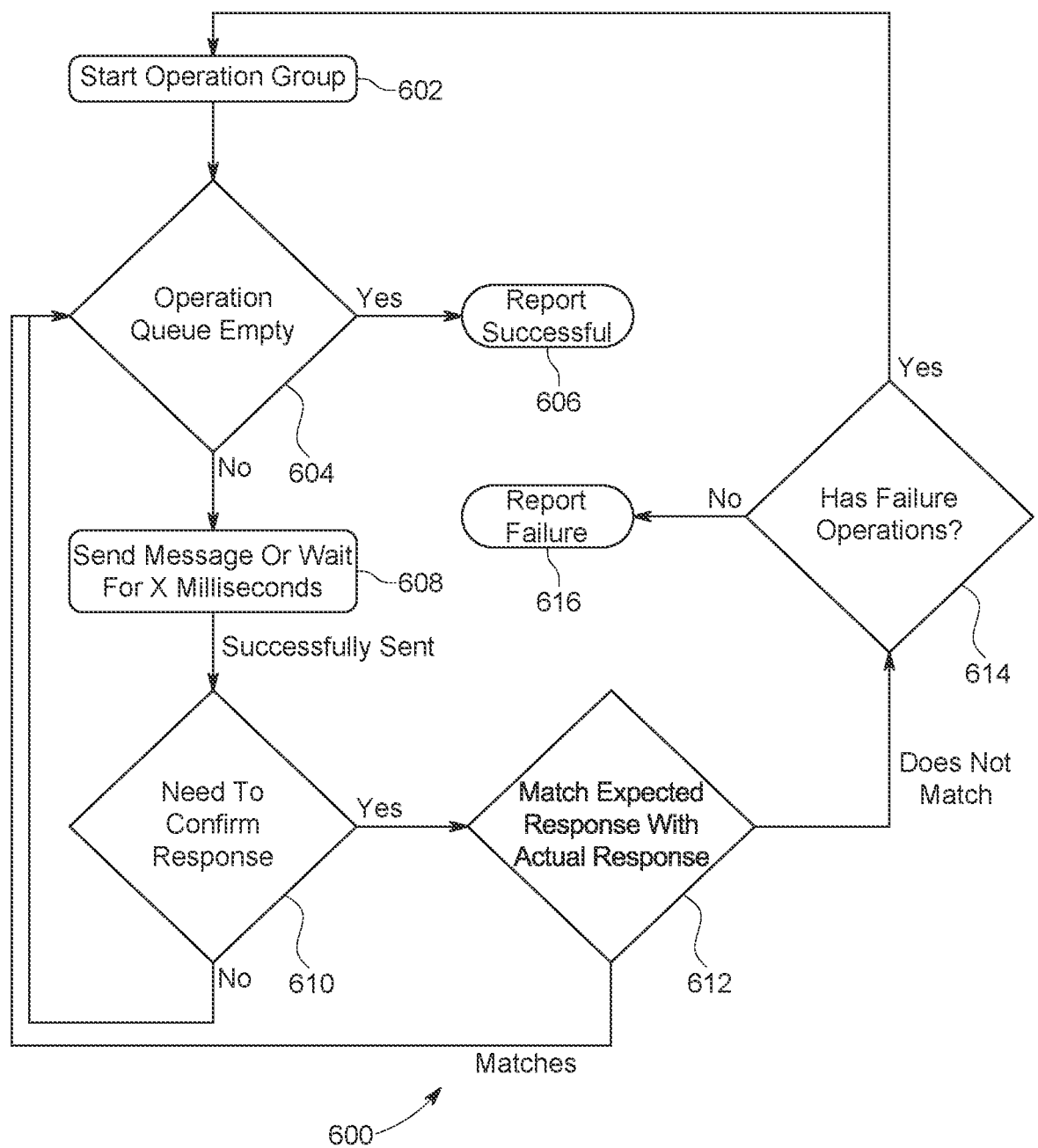
FIG. 6 depicts dataflow diagram for operations to update vehicle modules using staged and verified data.

FIG. 6 depicts a dataflow diagram 600 for operations to update vehicle modules using staged and verified data. Features of FIG. 6 may apply to any of FIGS. 1, 2, 3, 4, 5A-5I, and 7. The operations of FIG. 6 may be performed by the smart dongle 320 in conjunction with a target module. While the operations depicted in FIG. 6 are depicted in a defined order to re-program data, the order may be re-arranged or combined based on different module designs or communications standards.

At block 602, the smart dongle 320 may start an operation group. For instance the smart dongle 320 may generate an operation queue with at least one operation.

At block 604, the smart dongle 320 may determine whether the operation queue is empty.

At block 606, if the operation queue is empty (Block 604: Yes), the smart dongle 320 may report successful re-programming.

At block 608, if the operation queue is not empty (Block 604: No), the smart dongle 320 may select an operation (e.g., a first operation from the queue) and send message or wait a defined amount of time.

At block 610, the smart dongle 320 may determine whether to confirm response. If the confirm response is not needed (Block 610: No), the smart dongle 320 may loop back to the operation queue at block 604.

At block 612, if the confirm response is needed (Block 610: Yes), the smart dongle 320 may proceed to determine whether confirm response matches an expected actual response. If the response matches (Block 612: Matches), the smart dongle 320 may loop back to the operation queue at block 604.

At block 614, if the response does not match (Block 612: Does not Match), the smart dongle 320 may proceed to determine whether there are failure operations. If there are failure operations (Block 614: Yes), the smart dongle 320 may loop back to start an operation group for failure operations at block 602. At block 616, if there are not failure operations (Block 614: No), the smart dongle 320 may report failure.

Computer System

Figure 7:
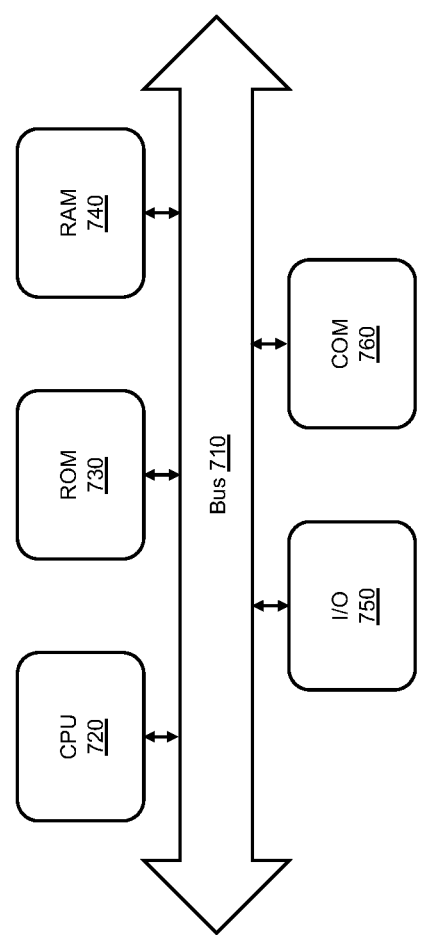
FIG. 7 depicts an example system that may execute techniques presented herein.

FIG. 7 depicts an example system that may execute techniques presented herein. FIG. 7 is a simplified functional block diagram of a computer that may be configured to execute techniques described herein, according to exemplary cases of the present disclosure. Specifically, the computer (or "platform" as it may not be a single physical computer infrastructure) may include a data communication interface 760 for packet data communication. The platform may also include a central processing unit 720 ("CPU 720"), in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Examples

Exemplary embodiments of the systems and methods disclosed herein are described in the numbered paragraphs below.

A1. A system for staging data and updating vehicle modules using staged data, the system comprising:
 a user interface device, wherein the user interface device is configured to:
  receive and store a re-program file from a server; and
  display a graphical user interface configured to receive a user input to initiate a re-program process for at least one onboard module of a vehicle; and
 a programming device configured to be physically and communicably coupled to an onboard port of the vehicle,
  wherein the onboard port is configured to be communicably coupled with the at least one onboard module,
  the programming device is configured to be communicably coupled, via a wired or wireless communication, to the user interface device, and the programming device is configured to:
   receive, via a defined sequence of messages with the user interface device, and store, via defined operations with a local cache, one or combinations of: data checksum map metadata, protocol map metadata, data checksum map information, protocol map information, and a data map (collectively, "mapping- and -byte data");
   in response to receiving an instruction message from the user interface device, re-program the at least one onboard module using the mapping-and-byte data; and
   in response to determining a checksum condition is satisfied, transmit a re-program success message to the user interface device.

A2. The system of A1, wherein the defined sequence of messages provides specific portions of the re-program file, so that the defined operations may store relevant data.

A3. The system of A2, wherein the defined operations ensure data integrity of byte-strings, so that when the programming device communicates write instructions to a target module of the at least one onboard module, the byte-strings are provided in a manner that reduces damage to vehicle modules/systems.

A4. The system of A3, wherein the defined operations perform additional checksums with each byte-string, in addition to communication level message checksums.

A5. The system of any of A1-A4, wherein the programming device loads and verifies at least portions of the mapping-and-byte data in a processor from the local cache.

A6. The system of A5, wherein the programming device, via the processor as loaded with the at least portions of the mapping-and-byte data, re-programs a target module of the at least one onboard module via messages.

A7. The system of A6, wherein the target module writes new data in accordance with messages from the programming device, requests responses, or provides feedback.

A8. The system of A7, wherein the feedback is a checksum generated in response to writing the new data.

A9. The system of A8, wherein the programming device is configured to respond in programmatic operations in response to the requests for response or the feedback, or absence thereof.

A10. The system of any of A1-A9, wherein the checksum condition is satisfied when checksums of the data checksum map information match checksums provided by (1) a processor of the programming device or (2) the at least one onboard module.

A11. The system of any of A1-A10, wherein a re-program success interface is displayed on the user interface device in response to receiving the re-program success message.

A12. The system of any of A1-A11, wherein the re-program file is generated and tested by engineers associated with the server.

A13. The system of A4, wherein the server is configured to manage re-program files including the re-program file; store re-program files in datastores; and serve re-program files to user interface devices including the user interface device.

A14. The system of any of A1-A13, wherein the re-program file is selected based on a user request for a specific type of action/performance, vehicle, and/or module.

A15. The system of any of A1-A14, wherein the re-program file is updated to form a updated re-program file, and the updated re-program file is transmitted to user interface devices including the user interface device, so that user interface devices are ready to re-program modules of vehicles.

A16. The system of any of A1-A15, wherein the graphical user interface instructs a user on how to set up the user interface device and the programming device to complete a module re-program.

A17. The system of any of A1-A16, wherein the graphical user interface instructs a user on how to engage the programming device with a port or connect the user interface device and the programming device using Bluetooth low energy.

A18. The system of any of A1-A17, wherein the server includes a file manager, the file manager is configured to generate, update, and send re-programming files to user interface devices, including the user interface device, and/or an alert to the user interface devices regarding installed re-programming files.

A19. The system of any of A1-A18, wherein, to re-program the at least one onboard module using the mapping-and-byte data, the programming device is configured to start an operation queue.

A20. The system of A19, wherein the programming device is configured to determine whether the operation queue is empty.

A21. The system of A20, wherein the programming device is configured to, in response to determining the operation queue is empty, report successful re-programming.

A22. The system of A20, wherein the programming device is configured to, in response to determining the operation queue is not empty, select an operation from the operation queue.

A23. The system of A22, wherein the programming device is configured to, in accordance with the selected operation, send a message or wait a defined amount of time.

A24. The system of A22, wherein the programming device is configured to determine whether to send a confirm response.

A25. The system of A24, wherein the programming device is configured to determine whether to send the confirm response in accordance with the selected operation.

A26. The system of A23, wherein the programming device is configured to determine whether a confirm response matches an expected actual response.

A27. The system of A25, wherein the programming device is configured to, in response to determining the confirm response does not match the expected actual response, determine whether there are failure operations.

A28. The system of A27, wherein the programming device is configured to, in response to determining there are failure operations, start an operation group for failure operations.

A29. The system of A25, wherein the programming device is configured to, (a) in response to determining there are not failure operations, report failure, or (b) in response to determining there are failure operations, select and perform a failure operation; in response to determining the failure operation is successful, continue re-programming the module.

A30. The system of any of A1-A29, wherein the programming device is configured to receive a data message from the user interface device to initiate a loading process of a processor of the programming device.

A31. The system of A30, wherein the programming device is configured to, in response to receiving the data message, load and verify data from the local cache into the processor.

A32. The system of A31, wherein the programming device is configured to determine whether all data for an instruction has been received.

A33. The system of A32, wherein the programming device is configured to buffer data, in the processor, until all the data for the instruction is received.

A34. The system of A33, wherein the programming device is configured to determine whether an instruction checksum matches a map checksum for the instruction.

A35. The system of A34, wherein the programming device is configured to write the instruction to a processor address using the protocol map and the data map.

A36. The system of A35, wherein the programming device is configured to determine if data was successfully written to the processor address.

A37. The system of A36, wherein the programming device is configured to determine if protocol map instructions are completed.

A38. The system of A37, wherein the programming device is configured to determine if message checksums match.

A39. The system of A38, wherein the programming device is configured to, in response to (1) the data was successfully written to the processor address, (2) the protocol map instructions are complete and (3) the message checksums match, transmit a confirmation/success message.

A40. The system of A39, wherein the user interface device is configured to receive the confirmation/success message, and, in response receiving the confirmation/success message, output a user interface that indicates a re-program process is ready to proceed.

A41. The system of any of A1-A40, wherein the programming device is configured to receive a data map message from the user interface device to initiate receipt of the data map.

A42. The system of A41, wherein the programming device is configured to reset variables and update a flashing state in response to receiving the data map message.

A43. The system of A42, wherein the programming device is configured to write data to the local cache.

A44. The system of A43, wherein the programming device is configured to determine whether all data for the data map has been received.

A45. The system of A44, wherein the programming device is configured to determine whether multiple checksums match.

A46. The system of A45, wherein the programming device is configured to, in response to determining that all data for the data map has been received and determining the multiple checksums match, transmit a confirmation/success message.

A47. The system of A46, wherein the user interface device is configured to receive the confirmation/success message, and the system is configured to, in response to the confirmation/success message, proceed to a data load process.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for staging data and updating vehicle modules using staged data, the system comprising:
   a user interface device, wherein the user interface device is configured to:

receive and store a re-program file from a server; and
display a graphical user interface configured to receive a user input to initiate a re-program process for at least one onboard module of a vehicle; and
a programming device configured to be physically and communicably coupled to an onboard port of the vehicle,
wherein the onboard port is configured to be communicably coupled with the at least one onboard module,
the programming device is configured to be communicably coupled, via a wired or wireless communication, to the user interface device, and the programming device is configured to:
receive, via a defined sequence of messages with the user interface device, and store, via defined operations with a local cache: data checksum map metadata, protocol map metadata, data checksum map information, protocol map information, and a data map (collectively, mapping-and-byte data);
in response to receiving an instruction message from the user interface device, re-program the at least one onboard module using the mapping-and-byte data; and
in response to determining a checksum condition is satisfied, transmit a re-program success message to the user interface device.

2. The system of claim 1, wherein the defined sequence of messages provides specific portions of the re-program file, so that the defined operations may store relevant data.

3. The system of claim 2, wherein the defined operations ensure data integrity of byte-strings, so that when the programming device communicates write instructions to a target module of the at least one onboard module, the byte-strings are provided in a manner that reduces damage to vehicle modules/systems.

4. The system of claim 3, wherein the defined operations perform additional checksums with each byte-string, in addition to communication level message checksums.

5. The system of claim 1, wherein the programming device loads and verifies at least portions of the mapping-and-byte data in a processor from the local cache.

6. The system of claim 5, wherein the programming device, via the processor as loaded with the at least portions of the mapping-and-byte data, re-programs a target module of the at least one onboard module via messages.

7. The system of claim 6, wherein the target module writes new data in accordance with messages from the programming device, transmits requests for responses, and/or transmits feedback.

8. The system of claim 7, wherein the feedback is a checksum generated in response to writing the new data.

9. The system of claim 8, wherein the programming device is configured to respond in programmatic operations in response to the requests for responses, the feedback, or absence thereof.

10. The system of claim 1, wherein the checksum condition is satisfied when checksums, of the data checksum map information, match checksums provided by (1) a processor of the programming device or (2) the at least one onboard module.

11. The system of claim 1, wherein, to re-program the at least one onboard module using the mapping-and-byte data, the programming device is configured to start an operation queue; determine whether the operation queue is empty; in response to determining the operation queue is not empty, select an operation from the operation queue; in accordance with the operation, send a message or wait a defined amount of time; receive a module response; determine whether to send a confirm response in accordance with the operation; and determine whether the module response matches an expected response.

12. The system of claim 11, wherein the programming device is configured to, in response to determining the module response does not match the expected response, determine whether there are failure operations; in response to determining there are failure operations, start an operation group for failure operations.

13. The system of claim 12, wherein the programming device is configured to select and perform a failure operation; and in response to determining the failure operation is successful, continue re-programming the at least one onboard module.

14. The system of claim 1, wherein the programming device is configured to receive a data map message from the user interface device to initiate receipt of the data map; write data to the local cache; determine whether all data for the data map has been received; determine whether multiple checksums match; and in response to determining that all data for the data map has been received and determining that the multiple checksums match, transmit a confirmation/success message.

15. The system of claim 14, wherein the user interface device is configured to receive the confirmation/success message, and the system is configured to, in response to the confirmation/success message, proceed to a data load process.

16. The system of claim 1, wherein the programming device is configured to receive a data message from the user interface device to initiate a loading process of a processor of the programming device; in response to receiving the data message, load and verify data from the local cache into the processor; determine whether all data for an instruction has been received; buffer data, in the processor, until all the data for the instruction is received; determine whether an instruction checksum matches a map checksum for the instruction; write the instruction to a processor address using a protocol map, of the protocol map information, and the data map; determine if data was successfully written to the processor address; determine if protocol map instructions are completed; determine if message checksums match; and in response to (1) the data was successfully written to the processor address, (2) the protocol map instructions are complete and (3) the message checksums match, transmit a confirmation/success message.

17. The system of claim 16, wherein the user interface device is configured to receive the confirmation/success message, and, in response receiving the confirmation/success message, output a user interface that indicates a re-program process is ready to proceed.

18. The system of claim 1, wherein a re-program success interface is displayed on the user interface device in response to receiving the re-program success message, and the re-program file is selected based on a user request for a specific type of action/performance, vehicle, and/or module.

* * * * *